(12) United States Patent  (10) Patent No.: US 8,119,963 B2
Scanlon  (45) Date of Patent: Feb. 21, 2012

(54) HIGH EFFICIENCY COUNTERBALANCED DUAL AXIS SOLAR TRACKING ARRAY FRAME SYSTEM

(75) Inventor: Mark Scanlon, Sedona, AZ (US)

(73) Assignee: Sedona Energy Labs, Limited Company, Flagstaff, AZ (US)

( * ) Notice: Subject to any disclaimer, the term of this patent is extended or adjusted under 35 U.S.C. 154(b) by 0 days.

(21) Appl. No.: 12/965,065

(22) Filed: Dec. 10, 2010

(65) Prior Publication Data

US 2011/0073161 A1  Mar. 31, 2011

Related U.S. Application Data

(60) Provisional application No. 61/318,577, filed on Mar. 29, 2010.

(51) Int. Cl.
*G01J 1/20*  (2006.01)
(52) U.S. Cl. .............. 250/203.4; 60/641.8; 60/641.11; 136/244; 136/245; 244/172.7
(58) Field of Classification Search .............. 250/203.4; 60/641.8, 641.11; 244/172.7; 136/244–245
See application file for complete search history.

(56) References Cited

U.S. PATENT DOCUMENTS

| | | | |
|---|---|---|---|
| 4,172,739 | A | 10/1979 | Tassen |
| 4,476,853 | A | 10/1984 | Arbogast |
| 4,535,961 | A | 8/1985 | Sobczak et al. |
| 5,022,929 | A | 6/1991 | Gallois-Montbrun |
| 5,325,844 | A | 7/1994 | Rogers et al. |
| 6,123,067 | A | 9/2000 | Warrick |
| 6,396,239 | B1 * | 5/2002 | Benn et al. ............. 320/101 |
| 6,498,290 | B1 | 12/2002 | Lawheed |
| 7,923,624 | B2 * | 4/2011 | Borton .................... 136/246 |
| 2006/0260672 | A1 | 11/2006 | Niederer |
| 2007/0070531 | A1 | 3/2007 | Lu |
| 2007/0251569 | A1 | 11/2007 | Shan et al. |

(Continued)

FOREIGN PATENT DOCUMENTS

EP  2123993  11/2009

(Continued)

OTHER PUBLICATIONS

Conergy, Tracking Systems for Photovoltaics / Specifications, Conergy SolarOptimus, 2008.

(Continued)

*Primary Examiner* — Georgia Y Epps
*Assistant Examiner* — Kevin Wyatt
(74) *Attorney, Agent, or Firm* — Foley & Lardner LLP

(57) ABSTRACT

A high efficiency, environmentally friendly system comprising a plurality of photovoltaic solar collecting panels (PV panels) is disclosed. The system comprises an outer frame to which a plurality of inner frames are mounted to which the plurality of PV panels are attached. To minimize shadowing by the outer frame upon one or more PV panels, at least one PV panel may extend beyond an endpoint of the main frame. The system also comprises an outer frame rotation actuator that rotates the outer frame and an inner frame rotation actuator that rotates the inner frames and the plurality of PV panels. The solar tracking array frames disclosed herein help to improve the quality of the environment by conserving a variety of energy resources (e.g., fossil fuels, hydroelectric energy, etc.) The solar tracking array frames disclosed herein also help to reduce greenhouse gas emissions, as solar tracking array frames do not produce carbon dioxide byproducts.

17 Claims, 9 Drawing Sheets

U.S. PATENT DOCUMENTS

| | | | |
|---|---|---|---|
| 2008/0143292 A1 | 6/2008 | Ward | |
| 2008/0196758 A1* | 8/2008 | McGuire | 136/245 |
| 2008/0308091 A1 | 12/2008 | Corio | |
| 2009/0032089 A1* | 2/2009 | Chen et al. | 136/251 |
| 2009/0050191 A1 | 2/2009 | Young et al. | |
| 2009/0050194 A1* | 2/2009 | Noble et al. | 136/251 |
| 2009/0145423 A1* | 6/2009 | Carcangiu et al. | 126/600 |
| 2009/0205637 A1 | 8/2009 | Moore et al. | |
| 2009/0250095 A1 | 10/2009 | Thorley et al. | |
| 2010/0018570 A1* | 1/2010 | Cashion et al. | 136/246 |
| 2010/0024861 A1* | 2/2010 | Cabanillas Saldana | 136/244 |
| 2010/0175741 A1 | 7/2010 | Thorne | |
| 2010/0314509 A1* | 12/2010 | Conger | 248/121 |
| 2011/0061643 A1* | 3/2011 | Bohl | 126/573 |

FOREIGN PATENT DOCUMENTS

| | | |
|---|---|---|
| WO | WO 2007098734 A2 * | 9/2007 |
| WO | 2008010250 | 1/2008 |
| WO | 2008092194 | 8/2008 |
| WO | 2008110644 | 9/2008 |

OTHER PUBLICATIONS

"Multi-axes sun-tracking system with PLC control for photovoltaic panels in Turkey", by Cemil Sungur, Selcuk University, Technical Science College, accepted Jun. 25, 2008, available online Aug. 9, 2008.

"The optimization of the tracking mechanism used for a group of PV panels", by C. Alexandru, C. Pozna, Product Design and Robotics Department, University "Transilvania" of Brasov, International Conference on Renewable Energies and Power Quality, Valencia, Spain, Apr. 15-17, 2009.

Linak, website http://www.solar-tracking.com, "Dual Axis Tracking Systems", date first accessed Feb. 1, 2011, date printed Feb. 25, 2011.

Instructables, website http://www.instructables.com/id/solar-pv-tracker, "Solar PV tracker", date first accessed Feb. 1, 2011, date printed Feb. 25, 2011.

International Search Report and Written Opinion for Application No. PCT/US2010/059824, date of mailing Jun. 3, 2011, 9 pages.

* cited by examiner

HIGH EFFICIENCY COUNTERBALANCED DUAL AXIS SOLAR TRACKING ARRAY FRAME SYSTEM

CROSS-REFERENCE TO RELATED APPLICATIONS

This application claims the benefit of U.S. Provisional Patent Application Ser. No. 61/318,577, entitled COUNTERBALANCED DUAL AXIS SOLAR TRACKING ARRAY FRAME, filed Mar. 29, 2010, which is incorporated by reference herein in its entirety.

FIELD OF INVENTION

The present disclosure relates to solar tracking array frames. The solar tracking array frames disclosed herein improve the quality of the environment by conserving a variety of energy resources (e.g., fossil fuels, hydroelectric energy, etc.) The solar tracking array frames disclosed herein also reduce greenhouse gas emissions, as solar tracking array frames do not produce carbon dioxide byproducts.

BACKGROUND OF THE INVENTION

A fundamental challenge in the solar energy industry is to efficiently absorb and convert solar radiation into usable forms of energy. To this end, a variety of modern photovoltaic solar collecting ("PV") systems exist. For example, some PV systems are static ("fixed panel arrays"); that is, their solar, or PV, solar collecting panels are fixed in a single plane and—often in the Northern Hemisphere—oriented in a southerly direction to maximize the incidence of solar radiation upon their panels. In general, static systems are far from optimized because they do not follow the sun and therefore do not capture the maximum solar power. Further, even where static PV panels are installed at the best possible solar angle, on average, they only produce 40-60% of the power that they are capable of producing.

Thus, in an effort to improve upon the efficiency of static solar systems, PV systems have been developed to track the motion of the sun ("tracking systems"). Solar tracking systems may track the sun about one or two axes. Tracking systems that move about a single axis are known as single axis tracking systems. Likewise, tracking systems that move about two axes are known as dual axis tracking systems.

Single axis tracking systems typically follow the motion of the sun from East to West; and this motion is commonly referred to as "azimuthal" tracking. Single axis tracking systems may yield an approximate 15-25% increase over the efficiency of a comparable static system (i.e., a system having a same number of collection elements). In like manner, dual axis tracking systems also follow the azimuthal motion of the sun and in addition, dual axis tracking systems follow the "zenithal" or seasonal motion of the sun. Zenithal motion represents the elevation of the sun above the horizon. For example, during the wintertime at Northern latitudes, the sun moves towards the South and is "lower" in the sky than it is during the summertime. Dual axis tracking systems yield approximately 40% or more power production over a fixed panel array.

Many dual axis tracking systems today comprise large racks of panels in an array mounted on a central vertical pole or post. In these systems, the number of panels that may be mounted is limited by the size and strength of the central pole and the foundation to support it. That is, the pole and mounting system must be sufficient to support the weight of the panel arrays mounted thereto and be constructed to withstand large wind loads. Pole mounted systems are self limiting because as one attempts to construct a larger pole mounted tracking array frame, one is required to continuously reinforce the pole and mounting system, and to increase the size of the supporting foundation. The costs associated with increased structural and foundation support are not cost-effective and are difficult to justify over the life span of the system.

What is needed, therefore, is a low cost and physically robust dual axis solar tracking array frame. In this regard, there have been several attempts to incorporate a dual axis tracking mechanism in a low cost framework. These primarily comprise a support frame structure with a rod and slide mechanism that uses linear actuators to move the solar panels into alignment on both axes.

For example, Thorley et al., U.S. Published Patent Application No. 2009/0250095 ("Thorley") discloses a low-profile dual axis solar tracking module mounted on a circular frame and having multiple parallel rows of PV panels (FIGS. 16-26; para. [0090]).

The system described by Thorley suffers from various design flaws. For instance, referring to FIG. 16-26, it is apparent that each array of PV panels sits encompassed by a mounting frame or railing (e.g., see FIG. 19, circular frame 122; FIG. 26, rectangular frame 136). This frame or railing may cast one or more shadows on the PV array, particularly where the sun is at an oblique angle to the array (e.g., in the hours just after sunup and just before sundown). Additionally, the Thorley system is not easily scalable. Referring again to FIGS. 16-26, the frame itself, frame support or railing (e.g., FIG. 19, circular frame 122; FIG. 25, 26, frame support for primary axis 152) surrounding the PV array would at least inhibit the coupling of a second (and third and fourth, etc.) PV array thereto.

Thus, the systems and methods described in greater detail below solve the problems described above, including those described with reference to Thorley. Specifically, the systems and methods described herein comprise a low cost frame system, itself comprising a counterbalanced outer frame whose main members are connected and supported by crossbeams positioned underneath the main rails, and a plurality of counterbalanced internal frames or panel supporting structures seated at least partially within the perimeter of the outer frame. In this way, the stress and strain on pole mounted systems inherent in prior art systems are reduced, and less expensive frame materials are made available. Additionally, because the panels can be rotated to a vertical position either on command or when high winds are detected via sensors, wind loading is drastically reduced compared to pole mounted arrays. Further, by repositioning the end pieces that bound or enclose the outer frame to a location underneath the main rails of the outer frame, systems may be connected together and so are scalable. Moreover, this repositioning of frame materials allows one or more PV arrays to be coupled together and controlled by a single actuator or set of actuators. This feature may be assisted by the relative ease of motion resulting from counterbalancing the main and inner frames. Additionally, repositioning the end pieces underneath the main rails also positions them underneath the PV panels and so eliminates shading of the panels on each end. Further still, by mounting PV panels far apart, shading by one panel of another is reduced or eliminated.

SUMMARY OF THE INVENTION

A high efficiency, environmentally friendly frame system that supports a plurality of photovoltaic solar collecting panels (PV panels) is disclosed. The system comprises an array frame to which the plurality of PV panels are mounted, actuators or other locomotion devices to rotate the frame and panels, and a control mechanism. The array frame is a device consisting of inner frames or panel support structures ("inner frames") and an outer frame all of which rotate around their respective axes to track the sun's daily and seasonal movement. Either the inner frames or the outer frame may track the sun's daily or seasonal movements independently of one another, or both the inner frames and outer frame may track both the sun's daily and seasonal movements cooperatively. That is, if the frame is positioned on a true East-West or North-South alignment, the inner frames will track in one direction and the outer frame will track the sun's movement in the other direction. However, if the frame is positioned on any other alignment, the inner frames and the outer frame will track the sun's movement in both directions simultaneously so as to optimally position the panels. By suspending the inner and outer frames around their axes, the entire array frame is always in balance, no matter how the PV panels are oriented.

The array frame system derives its high efficiency from its balanced nature. Since the inner and outer frames are always in balance, a minimal amount of force is required to rotate the system to track the sun. This small amount of force requires very little power and hence is highly efficient. Further efficiencies are derived from this balance in that the materials from which the frame is made can be lightweight as the stresses on the system are minimal, and the supporting foundation can be minimal since it does not have to stabilize a large out-of-balance mass at the end of a long moment arm.

To eliminate shadowing by the outer frame upon one or more PV panels, the outer frame is constructed of two parallel members which are supported by crossbeams attached to the undersides of the parallel members and thus are positioned underneath the panels. This design ensures that no structural member can cast a shadow on the panels.

Further, each PV panel in the plurality of PV panels may be separated by a distance from neighboring PV panels sufficient to minimize shadowing by each PV panel by and upon the neighboring PV panels. Any remaining potential inter-panel shading is eliminated through the control mechanism by rotating the panels in the opposite direction the sun is moving in the morning after sunrise and in the evening before sunset ("backtracking").

The system is scalable. For example, multiple array frames may be connected to one another and share locomotion devices and control mechanisms.

The system minimizes wind loading in multiple ways. The separation between panels results in spaces or holes through which wind passes unrestricted. Therefore the array does not form a large surface upon which the wind can act. These holes also create turbulence as the wind pass through them, lessening the wind's power on any other arrays in the wind's path. In addition, based on a command sent either manually, e.g. via a switch, or from a controller based on wind direction and/or speed data from sensors, the panels may be rotated into a vertical position so that in the best case the wind passes between the panels (louvering) exerting almost no force, in the average case, the wind strikes the panels at a angle which lowers the forces acting directly on the panels, or in the worst case the wind strikes a single panel directly (the panel on the windward end) which presents a very small surface area greatly lowering the force acting on the array. Further, with the panels in this position, as the wind passes over each subsequent panel, turbulence occurs which decreases the power of the wind.

The systems disclosed herein help to improve the quality of the environment by conserving a variety of energy resources (e.g., fossil fuels, hydroelectric energy, etc.) The systems disclosed herein also help to reduce greenhouse gas emissions, as solar tracking array frames do not produce carbon dioxide byproducts.

BRIEF DESCRIPTION OF THE DRAWINGS

A more complete understanding of the present invention may be derived by referring to the detailed description and claims when considered in connection with the accompanying Figures, where like reference numbers refer to similar elements throughout the Figures, and:

DETAILED DESCRIPTION

Figure 1A:
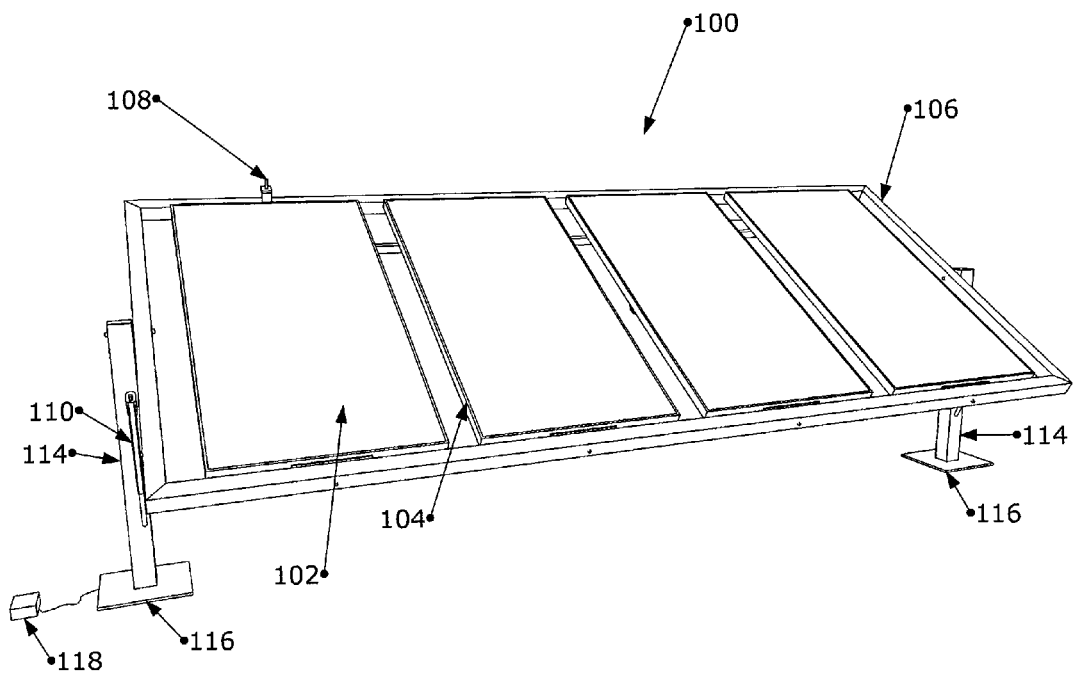
FIG. 1A illustrates a front view of a high efficiency counterbalanced dual axis solar tracking array frame in accordance with an exemplary embodiment.

The detailed description of exemplary embodiments herein makes reference to the accompanying Figures, which show the exemplary embodiments by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

In accordance with exemplary embodiments, a high efficiency counterbalanced dual axis solar tracking array frame comprises an arrangement of components that work together to dramatically increase the collection and conversion of solar radiation into electrical power or thermal energy (e.g., to heat water). In exemplary embodiments, the high efficiency counterbalanced dual axis solar tracking array frame may be used in conjunction with, but not limited to, a portable box, a parking garage, a portable trailer, a charge port, and/or a surface mounting system, among others.

In exemplary embodiments, a high efficiency counterbalanced dual axis solar tracking array frame is manufactured to accept a variety of solar collection devices or solar panels. In other exemplary embodiments, a high efficiency counterbalanced dual axis solar tracking array frame is manufactured together with one or more solar panels. The exact dimensions, configuration, and materials used for the systems and methods described herein may vary in accordance with factors such as structural materials utilized, efficiency of PV panels, location for deployment of the systems (e.g., wind prone areas, high temperature areas) and methods and deployment method utilized (e.g., air drop), and/or the like.

In exemplary embodiments, a high efficiency counterbalanced dual axis solar tracking array frame is manufactured by a computer-based system for manufacturing solar arrays. The high efficiency counterbalanced dual axis solar tracking array frame may be manufactured on an assembly line or partially upon an assembly line and under the control of the computer-based system. The high efficiency counterbalanced dual axis solar tracking array frame may be assembled during manufacture; or it may be manufactured as a kit and assembled by a purchaser of the kit at a later time. For example, an individual may purchase a high efficiency counterbalanced dual axis solar tracking array frame as an unassembled or partially assembled set of components; and the individual may assemble the components to produce an high efficiency counterbalanced dual axis solar tracking array frame.

Figure 1B:
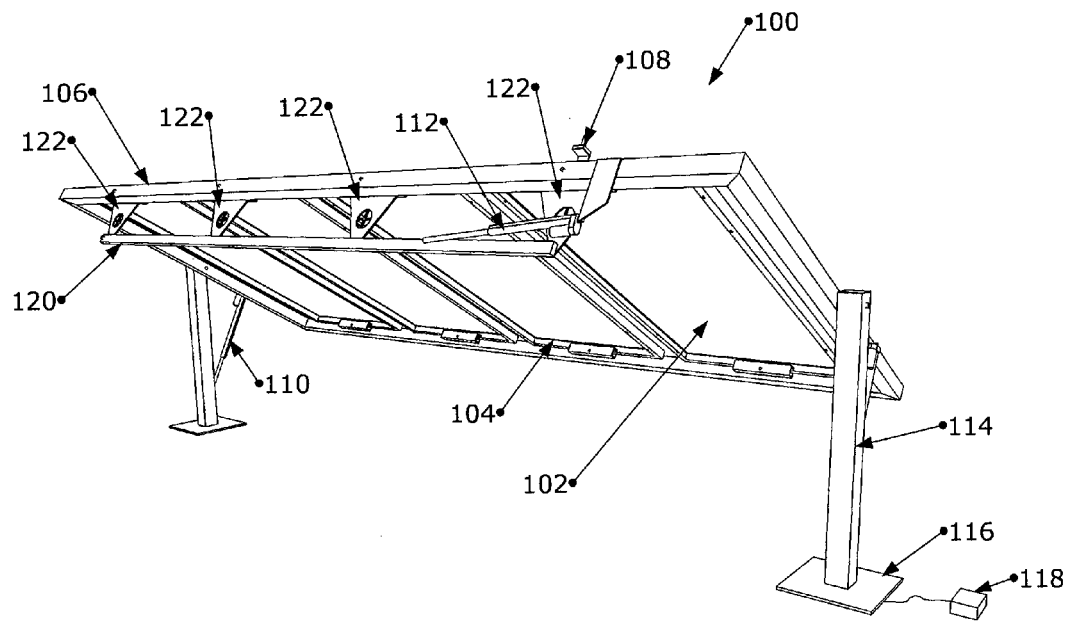
FIG. 1B illustrates a rear view of a high efficiency counterbalanced dual axis solar tracking array frame in accordance with an exemplary embodiment.

Turning now to the Figures, in accordance with exemplary embodiments, and with reference to FIGS. 1A and 1B, a front view of a high efficiency counterbalanced dual axis solar tracking array frame 100 ("array" or "system") is shown. The array 100 may comprise one or more photovoltaic solar collecting panels ("PV panels") 102, one or more inner frames 104, an outer frame 106, one or more sun sensors 108, one or more outer frame rotation actuators 110, one or more inner frame rotation actuators 112, one or more support posts 114, a base plate 116, a controller 118, one or more connecting rods 120, and one or more panel brackets 122.

Figure 4:
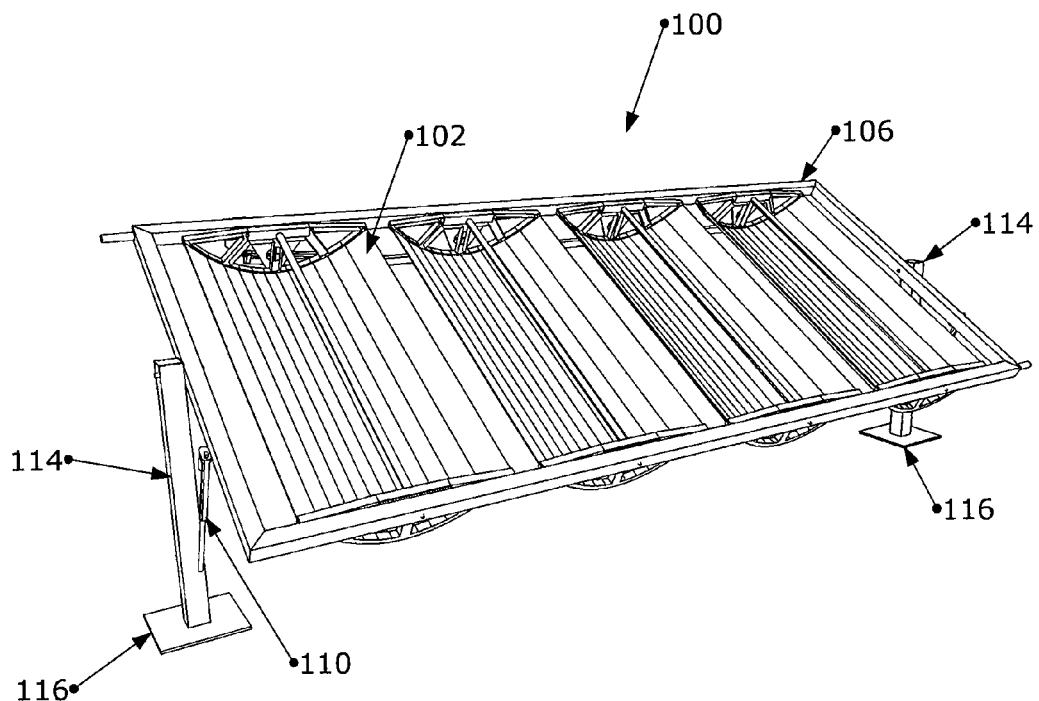
FIG. 4 illustrates a high efficiency counterbalanced dual axis solar tracking array frame comprising parabolic troughs for solar thermal power production in accordance with an exemplary embodiment of the present invention.

A PV panel 102 may comprise any of a variety of photovoltaic (or solar) panels. For example, a PV panel 102 may comprise solar cells having a monocrystalline silicon, polycrystalline silicon, ribbon silicon, amorphous silicon, and/or vaporware composition. A PV panel 102 may further comprise solar cells having a cadmium telluride, copper-indium selenide, gallium arsenide multijunction, light absorbing dyes, organic/polymer, and/or silicon thin film composition. A PV panel 102 may comprise—as shown at FIG. 4—a concentrating photovoltaic structure, such as, for example, a parabolic trough and/or an area of lenses for focusing or concentrating light on an area of solar cells. A concentrating photovoltaic structure may comprise one or more Fresnel lenses, one or more mirrors, one or more prisms, and/or any other construction or composition of optically reflective and/or refractive materials. A PV panel 102 may be configured or configurable to heat water (or another suitable fluid). Thus, in an embodiment, a PV panel 102 may comprise a batch system, a thermosyphon system, an active direct system, an active indirect system, a drainback system, a bubblepump system, and/or a combination thereof. A PV panel 102 may further comprise a combination of any of the foregoing.

In an embodiment, PV panels 102 may be separated by a distance sufficient to prevent or minimize shading by each PV panel 102 upon neighboring PV panels 102 and to allow wind to pass between the PV panels 102. For example, PV panels 102 may be spaced 10 to 15 inches apart, although in some implementations the spacing may be outside of this range. As the distance between PV panels 102 increases, sunlight must strike each panel 102 at an increasingly more oblique angle in order for that panel 102 to cast a shadow on a neighboring panel 102. In an embodiment, PV panels 102 may be separated by a distance that permits shading of one panel 102 by a neighboring panel 102 during an interval after sunrise and an interval prior to sunset (e.g., one hour). In an embodiment, the distance between PV panels 102 may be calculated to achieve an optimal configuration. An optimal configuration may be based upon factors including a percentage of open space between panels 102 in array 100, a capacity of array 100 to support the weight of one or more additional panels 102, and an anticipated solar energy left uncollected by virtue of one or more shadows cast by PV panels 102 upon neighboring PV panels 102. In an embodiment, PV panels 102 may perform a "backtracking" function (described in greater detail below), whereby the azimuthal angle of one or more PV panels 102 is adjusted (flattened) such that the PV panel 102 prevents shading of a neighboring PV panel 102.

In an embodiment, an inner frame 104 may comprise any type of frame or perimeter or partial perimeter configured or configurable to support a PV panel 102. An inner frame 104 may comprise a metal or metallic alloy or composition, a plastic or plastic composition, a hard rubber, wood, any combination thereof, and/or any other material suitable for supporting a PV panel 102.

In an embodiment, an outer frame 106 may comprise any type of frame or perimeter or partial perimeter configured or configurable to support one or more inner frames 104. An outer frame 106 may comprise a metal or metallic alloy or composition, a plastic or plastic composition, a hard rubber, wood, any combination thereof, and/or any other material suitable for supporting one or more inner frames 104.

Figure 2:
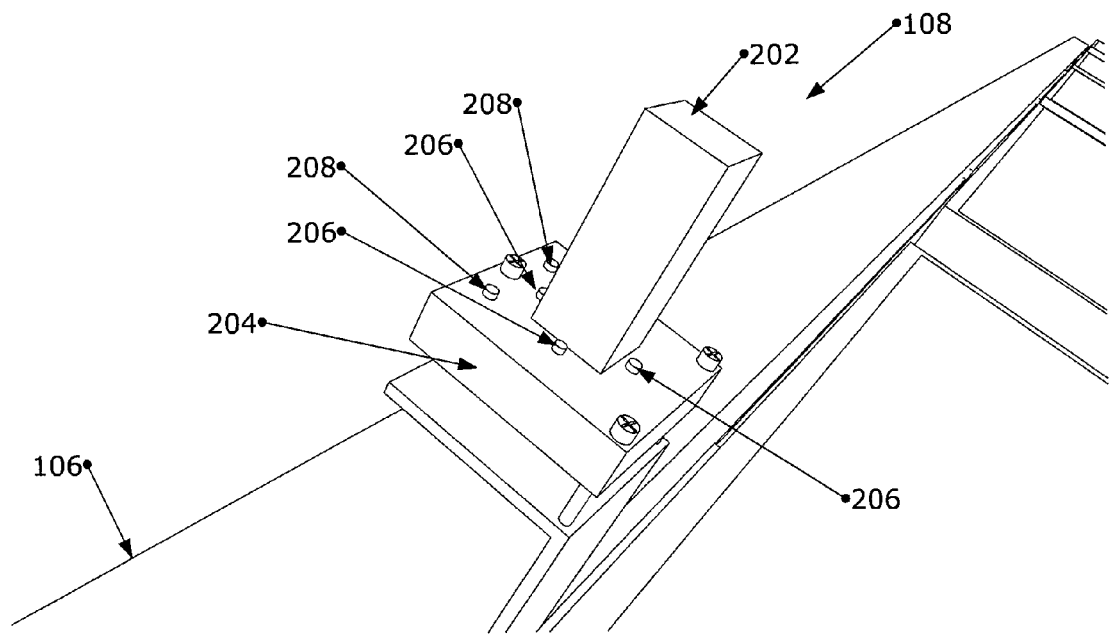
FIG. 2 illustrates a sun sensor in accordance with an exemplary embodiment.

In an embodiment, a sun sensor 108 may comprise any type of sensor configured or configurable to detect a quantity and/or intensity of light, and/or a position or angle of the sun. Thus, in an embodiment, and with reference now to FIG. 2, a sun sensor 108 may comprise a vertical shade 202, a shade base 204, a plurality of detector photodiodes 206, and/or a plurality of reference photodiodes 208. Sun sensor 108 may be mounted anywhere on array 100. In an embodiment, sun sensor 108 may be coupled to the outer frame 106. In an embodiment, sun sensor 108 may comprise any suitable number of photodiodes 206. In an embodiment, sun sensor 108 may comprise four photodiodes 206. In any case, each photodiode 206 may be coupled to base 204 adjacent to a side of vertical shade 202 such that a shadow of vertical shade 202 may fall upon one or more of photodiodes 206. In an embodiment, vertical shade 202 may comprise four sides; and each side may face one of the four cardinal directions. Reference photodiodes 208 may be mounted outside of an area of normal shadow (i.e., at least the umbra but preferably also the penumbra) that vertical shade 202 may cast.

In an embodiment, an outer frame rotation actuator 110 may comprise any locomotion device configured or configurable to rotate an inner frame 104 and/or an outer frame 106. Thus, an outer frame rotation actuator 110 may comprise an actuator, compression cylinder, piston, gear system, rotator, and/or the like.

In an embodiment, an inner frame rotation actuator 112 may comprise any locomotion device configured or configurable to rotate an inner frame 104. Thus, an inner frame rotation actuator 112 may comprise an actuator, compression cylinder, piston, gear system, rotator, and/or the like.

In an embodiment, one or more of the outer frame rotation actuators 110 and/or inner frame rotation actuators 112 may be coupled to a motor and/or a power supply (not shown). The motor and/or power supply may enable operation of actuators 110 and/or 112.

In an embodiment, a support post 114 may comprise any type of post or pillar configured or configurable to support one or more PV panels 102, one or more inner frames 104, and/or an outer frame 106. Thus, a support post 114 may comprise a metal or metallic alloy or composition, a plastic or plastic composition, a hard rubber, wood, any combination thereof, and/or any other material suitable for supporting one or more PV panels 102, one or more inner frames 104, and/or an outer frame 106.

In an embodiment, a base plate 116 may comprise any type of plate or flange configured or configurable to attach or couple array 100 to a surface or substrate (e.g., a ground surface, a wall surface, a charge port, a portable box, a portable trailer, and the like). Thus, base plate 116 may comprise a metal or metallic alloy or composition, a plastic or plastic composition, a hard rubber, wood, any combination thereof, and/or any other material suitable for coupling array frame 100 to a surface or substrate.

In an embodiment, a controller 118 may comprise any computer, controller, microcontroller, processor, plurality of processors, and/or other processing device configured or configurable to receive and process data. Controller 118 may comprise programmable logic and/or non-rewritable hardware. Controller 118 may comprise a tangible non-transitory memory (not shown), such as solid state ("flash") memory, a hard drive, and/or the like. Controller 118 may store and implement one or more computer algorithms for adjusting the azimuthal and/or zenithal angle of one or more PV panels 102, one or more inner frames 104, and/or one or more outer frames 106. The one or more computer algorithms may comprise one or more sets of instructions and may be stored on the one or more memories described above. Controller 118 may receive data from sun sensor 108 or other sensors 123 and/or 124 including but not limited to position, weight, wind, temperature, and movement. Controller 118 may be further configured to include or receive time, location, and compass headings from internal or external sensors and/or receivers such as GPS systems (see FIG. 7). Controller 118 may be further configured or configurable to generate and transmit instructions to one or more rotation actuators 110 and 112 and/or one or more actuating devices (not shown) coupled to rotation actuators 110 and 112. In an embodiment, controller 118 may comprise an electronic control system available from various vendors or a proprietary electronic control system.

In an embodiment, a connecting rod 120 may couple one or more rotation actuators 112 to one or more inner frames 104. Connecting rod 102 may comprise a metal or metallic alloy or composition, a plastic or plastic composition, a hard rubber, wood, any combination thereof, and/or any other material suitable for coupling one or more rotation actuator 112 to one or more inner frames 104.

In an embodiment, one or more panel brackets 122 may couple a connecting rod 120 to one or more PV panels 102, one or more inner frames 104, and/or one or more outer frames 106. In an embodiment, a panel bracket 122 may comprise a metal or metallic alloy or composition, a plastic or plastic composition, a hard rubber, wood, any combination thereof, and/or any other material suitable for coupling a connecting rod 120 to one or more PV panels 102, one or more inner frames 104, and/or one or more outer frames 106.

Figure 3:
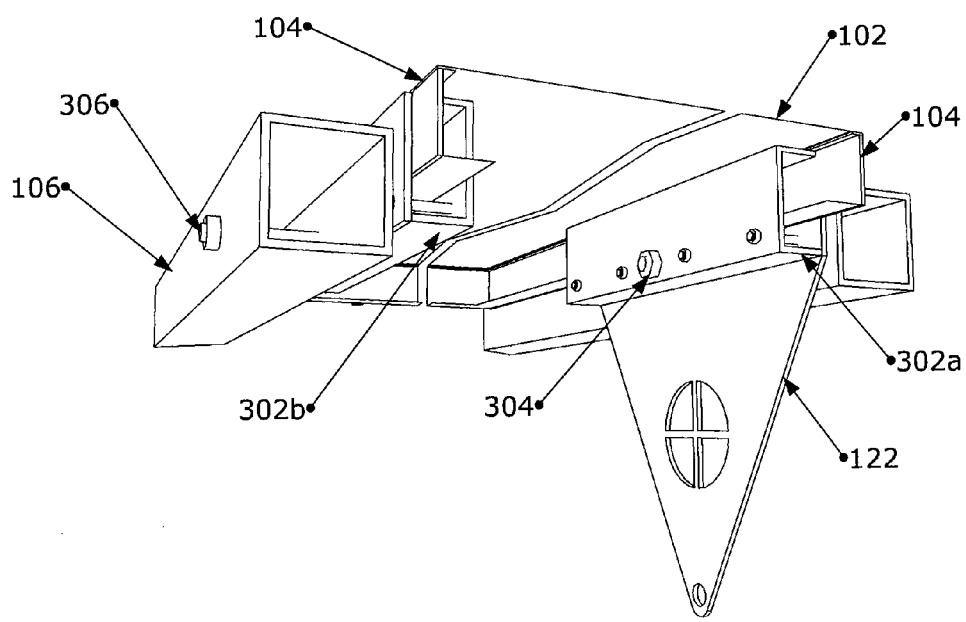
FIG. 3 illustrates a universal panel clamp in accordance with an exemplary embodiment.

In an embodiment, and with reference to FIG. 3, a panel bracket 122 may further comprise a universal panel clamp 302*a*. A universal panel clamp 302*a* may comprise a variety of hardware configured or configurable to receive and clamp to an internal frame 104. In an embodiment, a universal panel clamp 302*a* may be configured or configurable to receive internal frames 104 (cradling PV panels 102) of varying dimensions. Thus, in an embodiment, a panel bracket 122 may clamp to a portion of an inner frame 104. A bolt 304 may be inserted through panel bracket 122 and outer frame 106 to secure, or "sandwich," inner frame 104 between panel bracket 122 and outer frame 106.

With continuing attention to FIG. 3, an opposite side of internal frame 104 may be secured, or sandwiched, between a universal panel clamp 302*b* and outer frame 106. A bolt 306 may be inserted through universal panel clamp 302*b* and outer frame 106 to safely fasten internal frame 104 between universal panel clamp 302*b* and outer frame 106. In an embodiment, one or both of universal panel clamps 302*a* and 302*b* may comprise a metal or metallic alloy or composition, a plastic or plastic composition, a hard rubber, wood, any combination thereof, and/or any other material suitable for coupling an internal frame 104 to an outer frame 106.

In an embodiment (not shown), a panel bracket 122 may be configured or configurable to receive and hold a PV panel 102 in a manner that alleviates a need to drill one or more holes in the PV panel 102. For example a panel bracket 122 may hold or grab a PV panel 102 by applying a pressure between a first surface and a second opposable surface.

Figure 5:
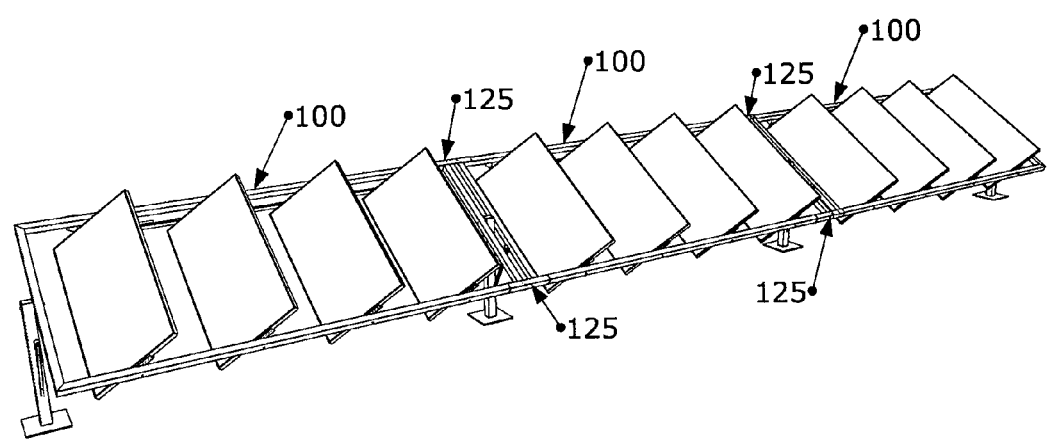
FIG. 5 illustrates a scalable high efficiency counterbalanced dual axis solar tracking array frame in accordance with an exemplary embodiment of the present invention.
Figure 7:
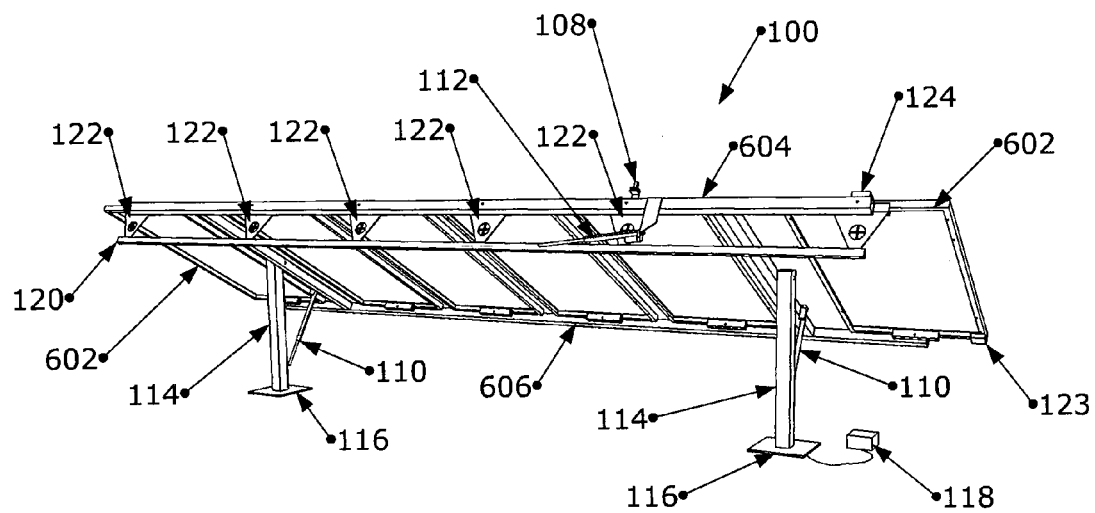
FIG. 7 illustrates a rear view of a high efficiency counterbalanced dual axis solar tracking array frame with solar panel extensions in accordance with an exemplary embodiment of the present invention.
Figure 8:
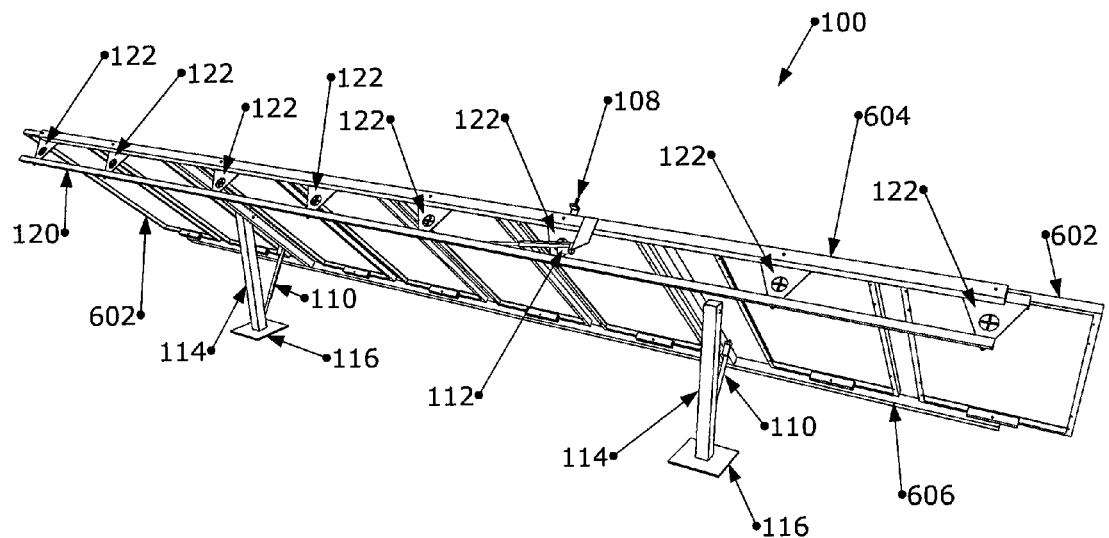
FIG. 8 illustrates a rear view of a high efficiency counterbalanced dual axis solar tracking array frame with multiple solar panel extensions in accordance with an exemplary embodiment of the present invention.

With reference to FIG. 5, in an embodiment, one or more arrays 100 may be coupled, guyed, or ganged together ("ganged array"). As described more fully below, one or more arrays 100 may be coupled by way of a connector 125 or a plurality of connectors 125. In another embodiment, one or more arrays 100 may be coupled or guyed by universal joints, a rope, cord, chain, or cable suitable to link a plurality of arrays 100 (not shown). Referring to FIGS. 7 and 8, the reader may observe that support posts 114 do not interfere with the chaining of multiple arrays 100, because connecting rod 120 does not make contact with support posts 114.

Further, and with reference to FIGS. 6, 7, 8, 11, 12, 13, and 14, in an embodiment, an array 100 may comprise one or more extension PV panels 602 ("extended array"). In an extended array, the extension PV panels 602 may be mounted on one or more ends of an array 100 by way of an outer frame 106. In an embodiment, outer frame 106 may not entirely encompass the extension PV panels 602. That is, outer frame 106 may not form a closed rectangular structure, or outer frame 106 may form a closed rectangular structure having an upper member 604 and a lower member 606 that extend beyond the closed rectangular structure. Thus, outer frame 106 may comprise an upper member 604 and a lower member 606.

In an embodiment, an array 100 may comprise an outer frame 106 that is open on its ends. That is, an outer frame 106 may simply comprise an upper member 604 and a lower member 606. PV panels 102 may or may not extend beyond an endpoint of outer frame 106. Nevertheless, similar to an extended array, outer frame 106 may not entirely encompass PV panels 102.

In an embodiment, upper member 604 may be coupled to lower member 606 by one or more support members 608 and 610. In an embodiment, and with reference to FIG. 13, one or more of support members 608 and 610 may be coupled to a lower surface or undersurface of upper member 604 and/or lower member 606. This design reduces shading or shadowing by support members 608 and 610 on PV panels 102, as shadows will not be cast over PV panels 102 by support members 608 and 610 until the slope associated with the PV panels 102 is very steep.

Figure 6:
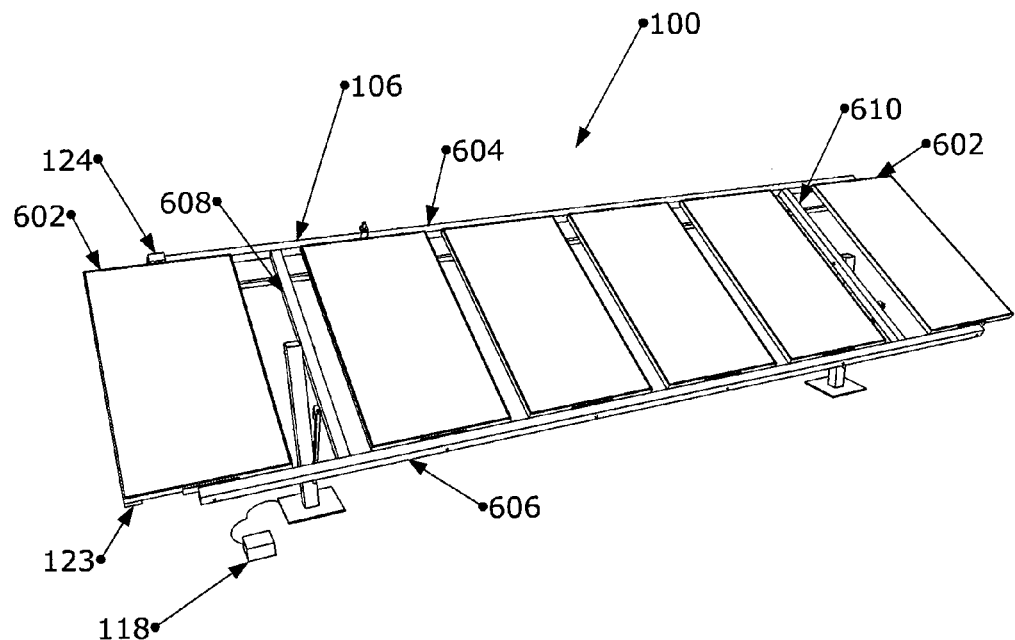
FIG. 6 illustrates a front view of a high efficiency counterbalanced dual axis solar tracking array frame with solar panel extensions in accordance with an exemplary embodiment of the present invention.

Further with continuing reference to FIGS. 6 and 7, various sensors 123 and 124 may be attached to the PV panels and/or outer frame to provide feedback to controller 118. Positional sensors may include inclinometers, accelerometers, and other position, stress, weight, temperature, wind, motion, and movement sensors that provide controller 118 with information to adjust the inner frames and outer frames in tracking the sun.

Figure 13:
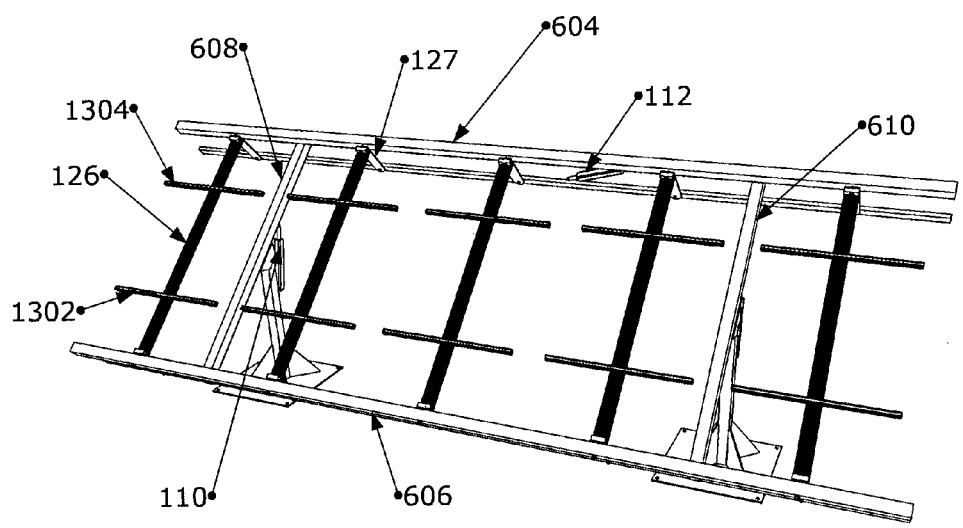
FIG. 13 illustrates a front view of a high efficiency counterbalanced dual axis solar tracking array frame comprising an under mounted support structure and panel support structures.
Figure 14:
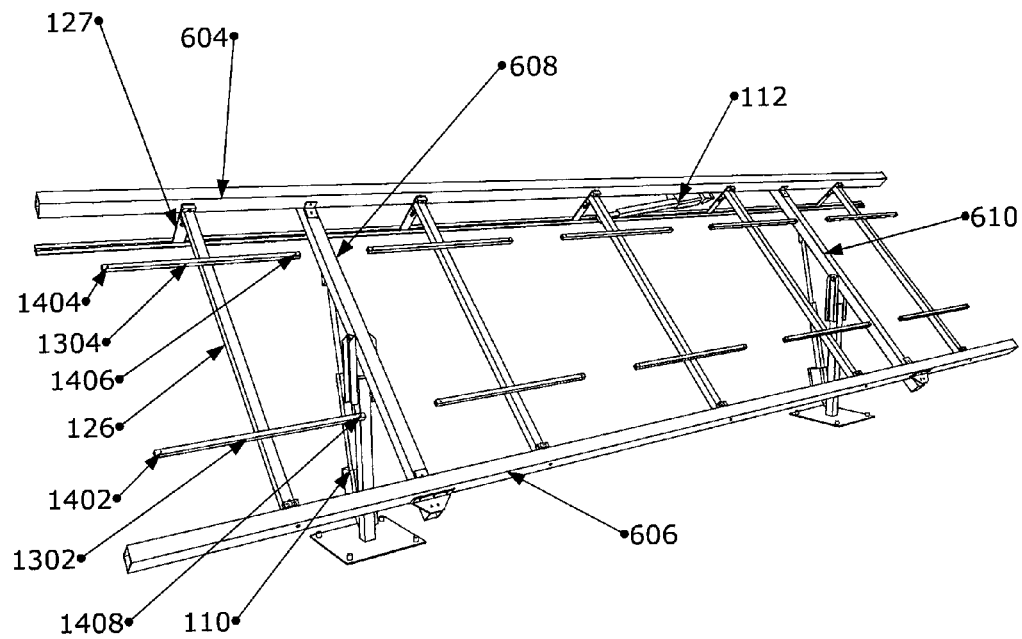
FIG. 14 illustrates a front view of a high efficiency counterbalanced dual axis solar tracking array frame with a simplified panel rotation mechanism.

Further, and with regard to FIGS. 13 and 14, inner frames 104 may be constructed as two mounting members 1302 and 1304 joined by a central axis member 126, onto which structure PV panels may be mounted. In addition, a plurality of inner frames 104 may be joined to the connecting rod 120 by lever arms 127 which may cause the inner frames 104, and thus the PV panels 102, to rotate when the connecting rod is moved. A PV panel 102 may be mounted on or to mounting members 1302 and 1304 by way of one or more apertures 1402, 1404, 1406, and/or 1408 drilled or disposed in members 1302 and 1304. More to the point, a PV panel 102 may be mounted (directly or indirectly) to mounting members 1302 and 1304 be inserting a screw, bolt, pin, and/or the like through a plurality of apertures disposed in the PV panel 102 as well as through the one or more apertures 1402, 1404, 1406, and/or 1408 disposed in mounting members 1302 and 1304. Thus, in general terms, a PV panel 102 may be mounted to an inner frame 104 by affixing the PV panel 104 to one or more of mounting members 1302 and/or 1304.

Where array 100 comprises a ganged array and/or extended array, each PV panel 102 comprising the ganged array and/or the extended array may be coupled to a same set of outer frame actuators 110, and/or a same panel rotation actuator 112. Each PV panel 102 and/or 602 in a ganged array and/or an extended array may be coupled to a connecting rod 120 by way of a connector 125 and/or a plurality of panel brackets 122, and/or one or more lever arms 127. In an embodiment, a connector 125 may comprise a plurality of shorter ganged connectors 125. In an embodiment, a ganged and/or extended array may comprise more than one outer frame rotation actuator 110 and/or more than one inner frame rotation actuator 112. Thus, an advantage of the systems and methods described herein is that a plurality of arrays 100 may be ganged and operated by a single set of rotation actuators 110 and/or actuator 112. This advantage may be accomplished using a single connector 125 (or series of interconnected connectors 125), and/or a single connecting rod 120, and/or a universal joint, guy rope/cord/chain/cable.

Figure 15:
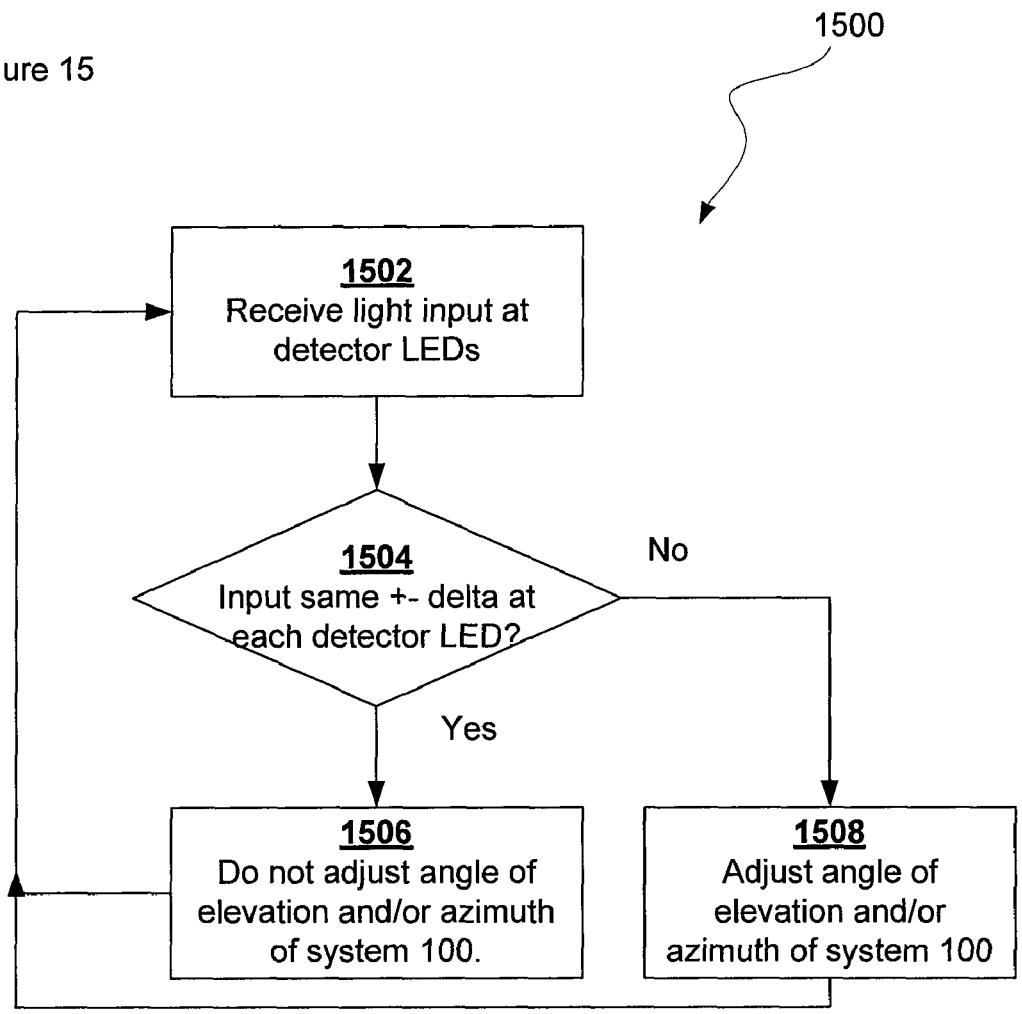
FIG. 15 illustrates a method for adjusting an angle of a high efficiency counterbalanced dual axis solar tracking array frame.

In operation, and with reference to FIG. 15, a process 1500 for adjusting one or more angles (i.e., an elevational angle and an azimuthal angle) of array 100 is described. Therefore, sun sensor 108 may transmit data about a quantity or intensity of light received by each photodiode 206 and/or each reference photodiode 208 (step 1502). For example, where the sun lies approximately ninety degrees to the plane defined by the surface of base plate 204 upon which each photodiode 206 and 208 is seated, vertical shade 202 will not cast a shadow over any of the detector photodiodes 206. Detector photodiodes 206 will therefore measure approximately a same or substantially similar input quantity and/or intensity (step 1504). Specifically, each detector photodiode 206 will measure a quantity and/or intensity of light that is within a threshold (+−Δ) of the quantity and/or intensity measured by each remaining detector photodiode 206 (step 1504). The input quantity and/or intensity of light measured at each detector photodiode 206 may be transmitted to controller 118, which may determine, based upon the one or more algorithms described above, that the sun sensor (which sits in a plane parallel to the plane defined the main frame 106) is turned at a ninety degree angle of elevation (or zenithal angle) to the sun—a ninety degree angle comprising an optimal receiving angle. This determination may be made by controller 118 in response to a quantity and/or intensity of light received by each detector photodiode 206 being within a threshold (+−Δ) of the quantity and/or intensity of light received by the other detector photodiodes 206 (step 1504). Where this is the case, controller 118 may determine not to adjust the angle of elevation (or zenith) and/or azimuth of array 100, as array 100 is already positioned in an optimal orientation (step 1506).

As the sun moves (or as the earth moves relative to the sun), one or more of detector photodiodes 206 may fall into a shadow cast by vertical shade 202. This occurrence may cause controller 118 to sense that one or more of the detector photodiodes 206 is receiving an intensity and/or quantity of sunlight that is above or below a threshold value (+−Δ) (step 1504). For example, controller 118 may receive an input for one detector photodiode 206 (the "shaded photodiode") that represents a very low intensity of quantity of light when it is compared with the inputs being generated by the remaining detector photodiodes 206. In this circumstance, controller 118 may determine that the shaded photodiode is in a shadow cast by vertical shade 202. In response to such a determination, controller 118 may adjust the elevational/zenithal angle of array 100 and/or the azimuthal angle of array 100. For instance, where a northerly or southerly mounted detector photodiode 206 is shadowed, controller 118 may adjust an angle of elevation of one or more main frames 106 (step 1508). Likewise, where an easterly or westerly mounted detector photodiode 206 is shadowed, controller 118 may adjust an azimuthal angle of one or more inner frames 104 and/or PV panels 102 (step 1508). Reference photodiodes 208 may provide a sample of the ambient light. Controller 118 may use data about the ambient light to calculate an appropriate position (elevational/zenithal and azimuthal) of array 100. In an embodiment, zenithal and/or azimuthal tracking may be achieved using an electrical actuator or manually, for example, through the use of a turnbuckle (not shown) that can be adjusted seasonally monthly or weekly depending on ones tolerance for participation. A turnbuckle may be manually adjusted in any desired interval (e.g., daily, weekly, monthly).

In an embodiment, if the array frame is positioned in an East-West orientation, one or more PV panels 102 may be mounted such that one or more neighboring PV panels 102 are shaded thereby in the early mornings or late afternoons. Specifically, shading may occur where PV panels 102 are tilted at sharp angles to catch light from a rising or setting sun. In these circumstances, controller 118 may provide instructions to inner frame rotation actuator 112 to reduce the angle of one or more PV panels 102 to a more shallow, or flatter, angle. That is, controller 118 may perform "backtracking," whereby one or more PV panels 102 are tracked back to an angle where the sun was more directly overhead and thereby expose a greater surface area of the PV panes to the sun.

Controller 118 may enable motion of one or more outer frames 106 and/or one or more inner frames 104 through one or more outer frame rotation actuators 110 and/or one or more inner frame rotation actuators 112. More particularly, controller 118 may change the angle of elevation of one or more outer frames 106 by transmitting a signal to one or more outer frame rotation actuators 110 which may cause the rotation actuators 110 to contract or expand. Contraction of the rotation actuators 110 may steepen the angle between the plane of one or more PV panels 102 and the surface upon which array 100 is mounted. Conversely, expansion of one or more rotation actuators 110 may make the angle formed between one or more PV panels 102 and the surface upon which array 100 is mounted more shallow or oblique.

In an embodiment, controller 118 may adjust the angle of one or more inner frames 104 and/or PV panels 102 by transmitting a signal to an inner frame rotation actuator 112 that causes expansion or contraction of the rotation actuator 112. Contraction and/or expansion of inner frame rotation actuator 112 may cause a connecting rod 120 to move, which may, in turn, cause one or more panel brackets mounted to one or more inner frames 112 to turn or rotate. Thus, the motion of the inner frame rotation actuator 112 may cause the inner frames 104—and therefore PV panels 102—to rotate. As the PV panels 102 rotate, the angle at which they receive incident light may be adjusted such that the incident light source (i.e., the sun) lies approximately at a ninety-degree angle to the collecting surface of each PV panel 102.

Figure 9A:
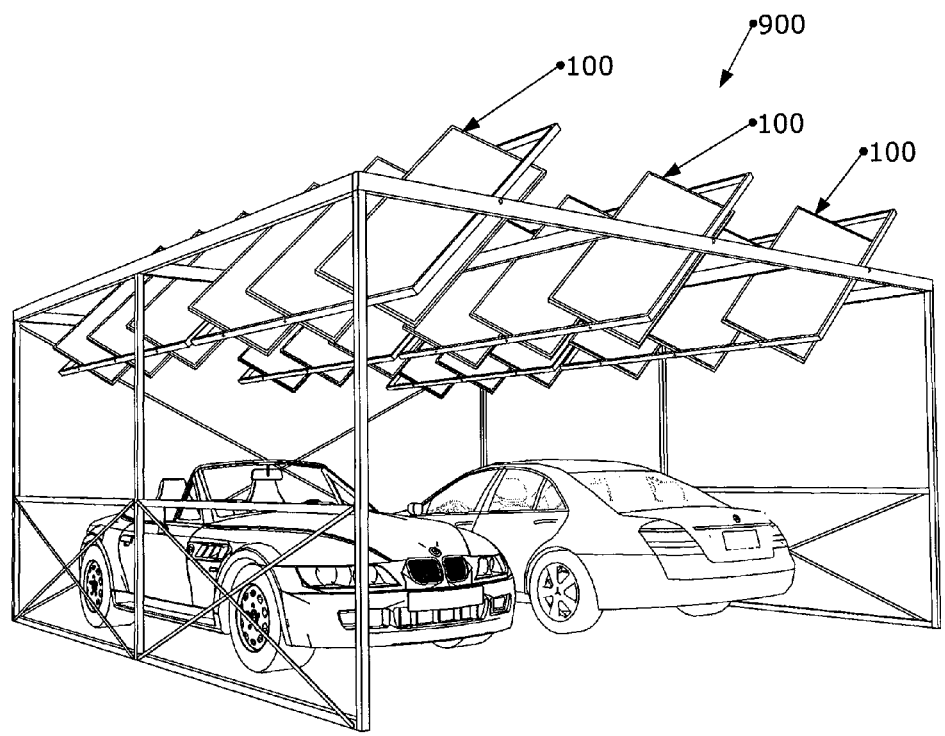
FIG. 9A illustrates an electric vehicle charge port comprising a plurality of high efficiency counterbalanced dual axis solar tracking array frames mounted within the framework of the carport structure in accordance with an exemplary embodiment of the present invention.
Figure 9B:
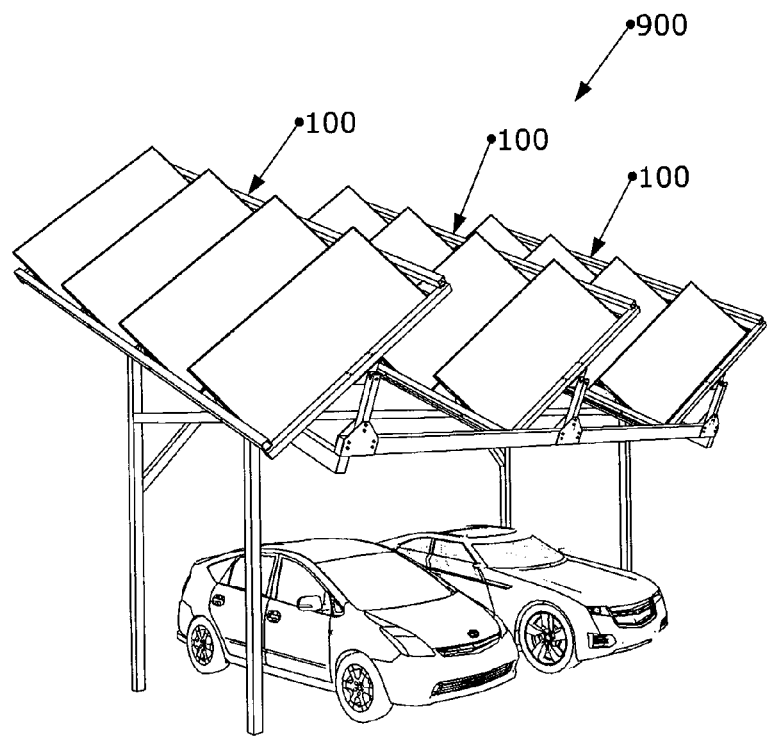
FIG. 9B illustrates an electric vehicle charge port comprising a plurality of high efficiency counterbalanced dual axis solar tracking array frames mounted above the carport structure in accordance with an exemplary embodiment of the present invention.

With reference now to FIGS. 9A and 9B, an electric vehicle charge port 900 comprising a plurality of high efficiency counterbalanced dual axis solar tracking array frames 100 is shown. Each array 100 may be mounted anywhere relative to the charge port 900 (e.g., on a side or on top). However, in an embodiment 9A, a plurality of arrays 100 are mounted on a roof surface of the charge port 900. However, in an embodiment 9B, a plurality of arrays 100 are mounted above the roof surface of the charge port 900. In these embodiments, each array 100 collects solar energy, which may be supplied through a battery and/or other charging system (not shown) to on or more electric vehicles. Moreover, in these embodiments, each array 100 provides full and/or partial shading for vehicles parked thereunder.

Figure 10:
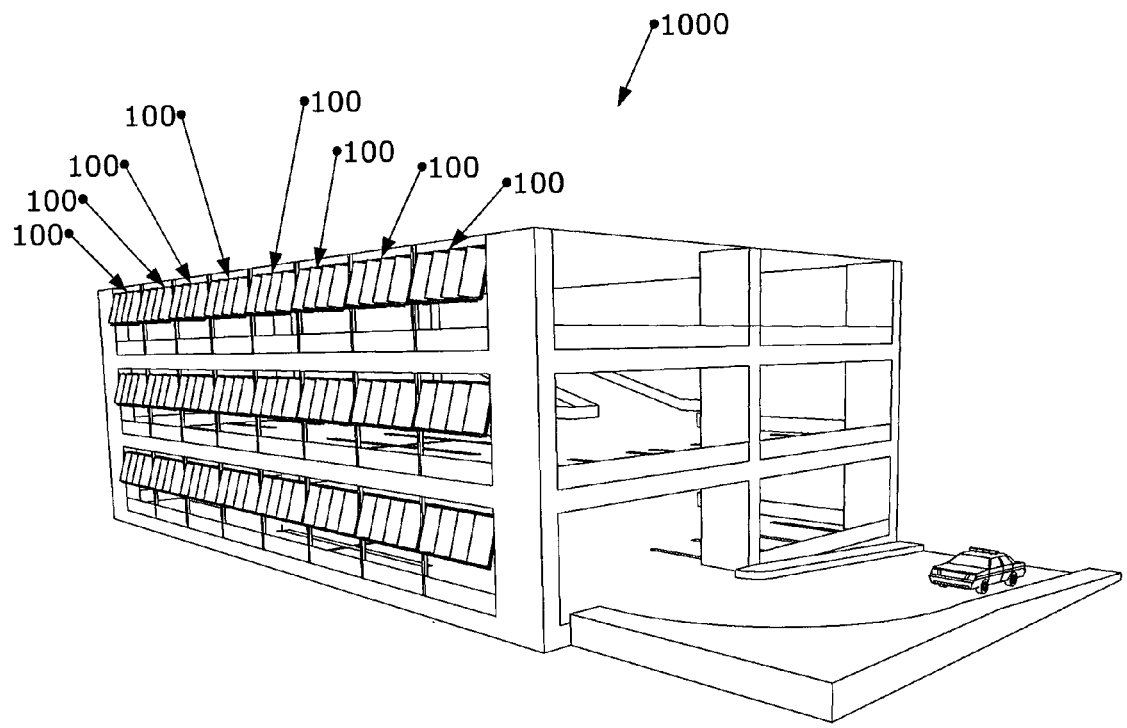
FIG. 10 illustrates a parking garage comprising a plurality of high efficiency counterbalanced dual axis solar tracking array frames in accordance with an exemplary embodiment of the present invention.

With reference to FIG. 10, a parking garage 1000 comprising a plurality of high efficiency counterbalanced dual axis solar tracking array frames 100 is shown. Each array may be mounted on any surface or to any portion of the parking garage 1000 that may accommodate one or more arrays 100. For example, one or more arrays 100 may be mounted on a side of parking garage 1000. In an embodiment, and where the parking garage is located in the Northern Hemisphere, one or more arrays 100 may be mounted on a southern exposure of parking garage 1000. Likewise, where parking garage 1000 is located in the Southern Hemisphere, one or more arrays 100 may be mounted on a northern exposure of parking garage 1000.

Figure 11:
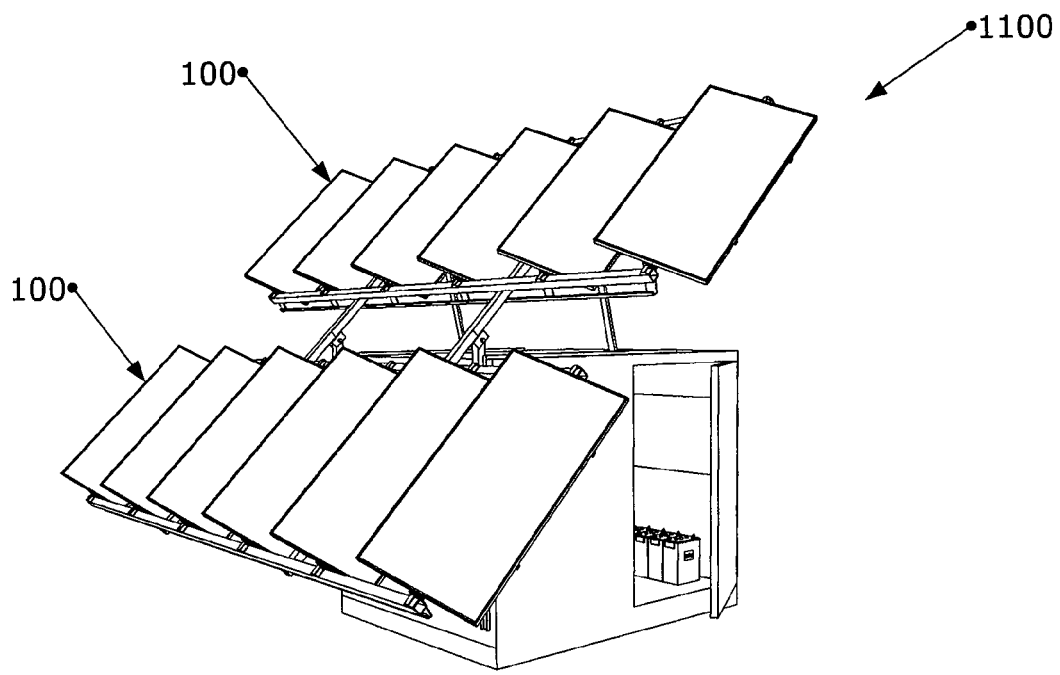
FIG. 11 illustrates a portable box comprising a plurality of high efficiency counterbalanced dual axis solar tracking array frames in accordance with an exemplary embodiment of the present invention.

With reference to FIG. 11, a portable box 1100 comprising a plurality of high efficiency counterbalanced, dual axis solar tracking array frames 100 is shown. In an embodiment, portable box 1100 may be configured or configurable to mount one or more arrays 100 on any side thereof. In an embodiment, one or more arrays 100 may be shipped or transported to a location inside portable box 1100 and deployed in the field. In an embodiment, portable box 1100 may further comprise one or more generators, one or more fuel cells, and one or more power storage devices (1102); and these storage devices may be coupled to one or more arrays 100 such that the solar energy collected by the arrays 100 is transferred to the power supplies 1102. A storage device may comprise a battery, a capacitor, a supercapacitor, and/or any other device configured or configurable to store electrical energy. In an embodiment, portable box 1100 may comprise a durable material, such as metal, a metal alloy, and/or any other material suitable for being air dropped or deposited in a rugged area. Portable box 1100 may further comprise a reinforced outer frame 106, inner frames 104, and the like.

Figure 12:
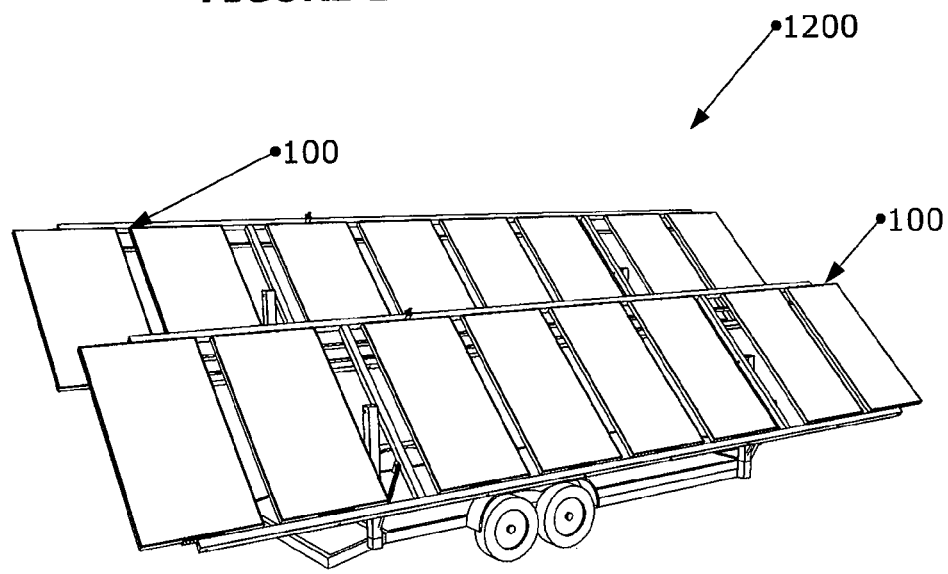
FIG. 12 illustrates a trailer comprising a plurality of high efficiency counterbalanced dual axis solar tracking array frames in accordance with an exemplary embodiment of the present invention.

With reference to FIG. 12, a trailer 1200 comprising a plurality of high efficiency counterbalanced dual axis solar tracking array frames 100 is shown. In an embodiment, trailer 1200 may comprise one or more ganged and/or one or more extended arrays 100. Further, in an embodiment, trailer 1200 may be configured or configurable to be towed to an area in which power is needed but for some reason (e.g., a natural disaster) power is unavailable. Thus, trailer 1200 may, in an embodiment, be manufactured to endure rugged conditions. For instance, trailer 1200 may be lightweight and comprise a heavy-duty undercarriage and/or a reinforced outer frame 106, inner frames 104, and the like.

The systems disclosed herein may be of great help to preserving the environment. For example, the systems disclosed above may help to improve the quality of the environment by conserving a variety of energy resources (e.g., fossil fuels, hydroelectric energy, etc.) The systems disclosed above also help to reduce greenhouse gas emissions, as solar tracking array frames do not produce carbon dioxide byproducts.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to 'at least one of A, B, and C' is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. All structural, chemical, and functional equivalents to the elements of the above-described exemplary embodiments that are known to those of ordinary skill in the art are expressly incorporated herein by reference and are intended to be encompassed by the present claims. Further, a list of elements does not include only those elements but may include other elements not expressly listed or inherent to such process, method, article, or apparatus.

What is claimed is:

1. A dual-axis solar tracking system comprising:
   a first array, comprising:
      a first plurality of photovoltaic solar collecting panels (PV panels) configured to receive solar radiation;
      a first upper rail and a first lower rail extending substantially parallel to one another and between which the first plurality of PV panels are each rotatably mounted about X axes that are substantially parallel to one another, and substantially perpendicular to the first upper rail and the first lower rail, and configured to be substantially perpendicular to the solar radiation;
      wherein the first upper rail and the first lower rail each comprise substantially free and oppositely disposed endpoints and are not coupled to each other at their respective endpoints;
   a second array, comprising:
      a second plurality of PV panels configured to receive solar radiation;
      a second upper rail and a second lower rail extending substantially parallel to one another and between which the second plurality of PV panels are each rotatably mounted about X axes that are substantially parallel to one another, and substantially perpendicular to the second upper rail and the second lower rail, and configured to be substantially perpendicular to the solar radiation;
      wherein the second upper rail and the second lower rail each comprise substantially free and oppositely disposed endpoints and are not coupled to each other at their respective endpoints; and
   at least one upper connector coupling together adjacent endpoints of the first and second upper rails, and at least one lower connector coupling together adjacent endpoints of the first and second lower rails, so that two or more arrays are joined together to provide a scaleable assembly.

2. The system of claim 1, further comprising a controller that determines a position of the sun relative to a sun sensor and adjusts at least one of: an angle of the X axes, and an angle of the first and second plurality of PV panels, so that the PV panels are moved in response to the position of the sun.

3. The system of claim 1, further comprising a controller that determines a position of the sun via an algorithm and adjusts at least one of: an angle of the X axes, and an angle of the first and second plurality of PV panels, so that the PV panels are moved in response to the position of the sun.

4. The system of claim 1, wherein each PV panel in the first and second plurality of PV panels is separated by a distance from neighboring PV panels sufficient to minimize shadowing by each PV panel by and upon the neighboring PV panels.

5. The system of claim 1, wherein each PV panel in the first and second plurality of PV panels is separated by a distance from neighboring PV panels sufficient to prevent shadowing by each PV panel by and upon the neighboring PV panels during an interval that excludes a period after sunrise and a period before sunset.

6. The system of claim 1, wherein a space between the PV panels in the first and second plurality of PV panels allows wind to pass through minimizing the force of the wind on the first and second arrays.

7. The system of claim 1, wherein the PV panels in the first and second plurality of PV panels can be rotated to any one of a vertical position, a horizontal position and a louvered position, minimizing the force of wind on the first and second arrays because the wind passes between the PV panels, because the wind strikes the PV panels at an angle, or because the wind strikes a single windward panel of the first and second plurality of PV panels.

8. The system of claim 1, wherein an azimuthal angle of at least one PV panel in the first and second plurality of PV panels is backtracked in response to a shadow cast by the PV panel upon a neighboring PV panel.

9. The system of claim 1, wherein an azimuthal angle of at least one PV panel in the first and second plurality of PV panels is backtracked in response to a time of day.

10. The system of claim 1, wherein at least one of the PV panels in the first and second plurality of PV panels extends beyond the endpoints of the first upper and lower rails or the second upper and lower rails.

11. The system of claim 1, further comprising a charge port upon which the system is mounted, wherein the first and second plurality of PV panels are configured to shade a vehicle as solar energy collected by the PV panels charges the vehicle.

12. The system of claim 1, further comprising a first actuator coupled to the first array and the second array and configured to rotate in unison the first plurality of PV panels about the X axes and the second plurality of PV panels about the X axes to provide solar tracking of the first and second plurality of PV panels on a daily basis.

13. The system of claim 12, wherein the first upper and lower rails at least partially define a first outer frame, and the second upper and lower rails at least partially define a second outer frame, and further comprising a second actuator coupled to the first outer frame and the second outer frame and configured to rotate in unison the first plurality of PV panels and the second plurality of PV panels about a Y axis that is substantially perpendicular to the X axes to provide solar tracking of the first and second plurality of PV panels on a seasonal basis.

14. The system of claim 13, further comprising a portable box that holds the first upper rail and first lower rail and the second upper rail and second lower rail, the first and second plurality of PV panels, the first actuator, the second actuator, and a power supply during a transportation process and acts as a mounting surface after the transportation process.

15. The system of claim 1, further comprising:
   a first actuator configured to rotate the first and second plurality of PV panels about their respective X axes between an easterly-facing position and a westerly-facing position to track a position of the sun on a daily basis;
   a second actuator configured to rotate the first upper rail and the first lower rail and the second upper rail and the second lower rail and the first and second plurality of PV panels about the Y axis between a northerly-facing position and southerly-facing position to track the position of the sun on a seasonal basis;
   one or more sensors operable to provide a signal representative of the position of the sun;

one or more sensors operable to provide a signal representative of shadowing on one or more of the PV panels; and a controller having a microprocessor and configured to:

(a) operate in a first tracking mode to provide instructions to the first actuator to move the first and second plurality of PV panels from the easterly-facing position toward the westerly-facing position to track the position of the sun from morning to evening, and (b) operate in a first backtracking mode to override the first tracking mode and provide instructions to the first actuator to move the first and second plurality of PV panels away from the easterly-facing position or the westerly-facing position until the first and second plurality of PV panels are substantially free of shadowing.

16. The system of claim 15 wherein the controller is further configured to operate in a second tracking mode to provide instructions to the second actuator to move the first and second plurality of PV panels between the southerly-facing position and the northerly-facing position to seasonally track the position of the sun.

17. The system of claim 16 wherein the controller is further configured to operate in a second backtracking mode to override the second tracking mode and provide instructions to the second actuator to move the first and second plurality of PV panels away from the southerly-facing position or the northerly-facing position until the first and second plurality of PV panels are substantially free of shadowing.

* * * * *